United States Patent
Taylor et al.

(10) Patent No.: US 11,168,770 B2
(45) Date of Patent: Nov. 9, 2021

(54) VEHICLE DRIVE MECHANISM

(71) Applicant: Brose Fahrzeugteile GmbH & Co. Kommanditgesellschaft, Bamberg, Bamberg (DE)

(72) Inventors: Kim Taylor, Farmington Hills, MI (US); Andrew Lakerdas, London (CA); Mark Farrugia, Clarkston, MI (US); Alwin Macht, Lake Orion, MI (US); Michael Kuiper, Shelby Township, MI (US)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 13 days.

(21) Appl. No.: 16/420,787

(22) Filed: May 23, 2019

(65) Prior Publication Data

US 2020/0370629 A1  Nov. 26, 2020

(51) Int. Cl.
*F16H 25/24* (2006.01)
*E05F 15/622* (2015.01)
*F16D 11/00* (2006.01)
*E05F 15/63* (2015.01)

(52) U.S. Cl.
CPC ........... *F16H 25/24* (2013.01); *E05F 15/622* (2015.01); *E05F 15/63* (2015.01); *F16D 11/00* (2013.01); *E05F 2015/631* (2015.01); *E05Y 2900/531* (2013.01)

(58) Field of Classification Search
CPC ... E05F 2015/631; E05F 15/622; E05F 15/63; E05F 15/652; E05F 15/655; E05F 15/643; E05F 15/689; E05F 15/697; E05Y 2900/531; E05Y 2600/31; F16H 25/24; F16H 25/2409; F16H 2025/2043; F16D 11/00; A47B 88/49; A47B 2210/0048; A47B 88/40; B60J 5/12; B60J 5/102; B60J 5/105; B60J 5/106; B66F 3/10;
(Continued)

(56) References Cited

U.S. PATENT DOCUMENTS 3,707,930 A * 1/1973 Yindra .................... A47B 9/04
                                                               108/147
3,836,011 A * 9/1974 Sakamoto ............. B66C 23/705
                                                               212/349
(Continued)

FOREIGN PATENT DOCUMENTS

EP    0586347 A1 *  3/1994  ............. E05F 15/77
EP    1348830 A2 * 10/2003  ............ E05F 15/622
WO  2018145883 A1    8/2018

*Primary Examiner* — Jake Cook
*Assistant Examiner* — T. Scott Fix
(74) *Attorney, Agent, or Firm* — Brooks Kushman, P.C.

(57) ABSTRACT

A drive mechanism for adjusting a position of a vehicle closure, with respect to a vehicle body, is provided. The drive mechanism may include a linear drive and a telescoping arrangement. The linear drive may include a spindle and a spindle nut and the telescoping arrangement may be coupled to the spindle nut and include a pair of gears coupled to one another. As the spindle rotates, the pair of gears may rotate to extend and retract translating portions of the telescoping arrangement in a telescoping manner such that the position of the vehicle closure may be adjusted.

20 Claims, 4 Drawing Sheets

(58) Field of Classification Search
CPC ........ B25J 18/02; B25J 18/025; F16C 29/043;
F16C 33/306; F16C 29/02; B60P 3/34
USPC .................. 74/89.17, 89.38, 109, 424.71
See application file for complete search history.

(56) References Cited

U.S. PATENT DOCUMENTS

| | | | | |
|---|---|---|---|---|
| 4,077,268 A * | 3/1978 | Hill | ................... | F16H 25/2427 74/424.71 |
| 4,254,928 A * | 3/1981 | Huempfner | ............ | F16M 11/18 108/147 |
| 4,802,374 A * | 2/1989 | Hamelin | .............. | B60N 2/0232 248/429 |
| 4,872,903 A * | 10/1989 | Periou | ................... | B60N 2/067 74/89.38 |
| 5,322,334 A * | 6/1994 | Hammer | ............ | B05C 17/0205 294/210 |
| 5,927,144 A * | 7/1999 | Koch | ................... | A47C 20/041 297/330 |
| 6,210,097 B1 * | 4/2001 | Kim | ........................ | B25J 5/007 414/522 |
| 6,346,788 B1 * | 2/2002 | Nagai | ................... | B23Q 11/08 318/432 |
| 6,378,392 B1 * | 4/2002 | Dombrowski | ........ | E05F 15/619 296/56 |
| 6,507,964 B1 * | 1/2003 | Lewandowski | ........ | A61G 7/012 5/600 |
| 6,755,458 B1 * | 6/2004 | Oberheide | ............ | E05F 1/1091 296/146.8 |
| 6,799,790 B2 * | 10/2004 | Sakai | ................... | E05F 15/619 296/146.8 |
| 6,891,344 B2 * | 5/2005 | Sakai | ................... | E05F 15/619 296/146.8 |
| 6,966,149 B2 * | 11/2005 | Fenelon | ............... | E05F 11/385 49/349 |
| 7,281,773 B2 * | 10/2007 | Sato | ........................ | E05F 1/16 312/333 |
| 8,042,416 B2 * | 10/2011 | Pfister | ...................... | B23Q 5/40 74/89.33 |
| 8,402,853 B2 * | 3/2013 | Pfister | ...................... | F16C 29/12 74/89.32 |
| 8,894,099 B2 * | 11/2014 | Cordes | .................... | A47L 9/244 285/7 |
| 9,010,205 B2 * | 4/2015 | Schroeder | .............. | F16H 25/20 74/89.32 |
| 9,763,840 B2 * | 9/2017 | Rigsby | ................. | A61G 7/0524 |
| 9,945,416 B2 * | 4/2018 | Lu | .......................... | F16C 29/045 |
| 9,970,225 B2 * | 5/2018 | Wynder | ................. | E05D 15/22 |
| 9,993,077 B2 * | 6/2018 | Chen | ..................... | F16C 29/005 |
| 10,506,879 B1 * | 12/2019 | Chen | ..................... | A47B 88/493 |
| 2004/0104649 A1 * | 6/2004 | Muller | ..................... | A47B 88/467 312/333 |
| 2004/0130173 A1 * | 7/2004 | Meijer | ...................... | B60P 3/34 296/26.01 |
| 2011/0187254 A1 * | 8/2011 | Chen | ..................... | A47B 88/49 312/334.8 |
| 2013/0127319 A1 * | 5/2013 | Breisacher | ........... | A47B 88/493 312/334.23 |
| 2013/0127320 A1 * | 5/2013 | Greussing | ............ | A47B 88/493 312/334.44 |
| 2013/0129266 A1 * | 5/2013 | Chen | ..................... | A47B 88/447 384/20 |
| 2014/0259413 A1 * | 9/2014 | Johnson | ............... | A61G 7/0506 5/611 |
| 2014/0298941 A1 * | 10/2014 | Berhan | .................. | F16H 55/12 74/445 |
| 2015/0033885 A1 * | 2/2015 | Kristen | ................ | A47C 1/0242 74/89.23 |
| 2016/0025198 A1 * | 1/2016 | Chen | ..................... | F16H 25/20 74/89.33 |
| 2016/0047446 A1 * | 2/2016 | Hung | ..................... | F16H 25/20 74/89.35 |
| 2017/0067548 A1 * | 3/2017 | Neuhaus | .................. | H02P 1/00 |
| 2017/0184151 A1 * | 6/2017 | Huang | .................. | F16C 29/008 |
| 2017/0211671 A1 * | 7/2017 | Nakayama | .............. | C23C 16/27 |
| 2018/0080271 A1 * | 3/2018 | Oster | .................... | E05F 15/614 |
| 2020/0040939 A1 * | 2/2020 | Mattern | ............... | A47B 88/493 |

* cited by examiner

VEHICLE DRIVE MECHANISM

TECHNICAL FIELD

The present disclosure relates to an actuator for a vehicle, particularly an actuator configured to open, close, adjust, or maintain a position of one or more vehicle closures.

BACKGROUND

Electromechanical operation of vehicle closures such as doors, liftgates, decklids, tailgates and hoods may be included in a vehicle for convenience and ergonomic benefits. Because autonomous or "self-driving" vehicle closures may not be closed properly after a passenger has exited the vehicle, powered actuators capable of automatic opening and closing the vehicle closures may be a necessity.

To electromechanically operate vehicle closures may be constrained by size and weight limitations as well as cost considerations. While the actuators may be necessary, the additional components required, such as a motor, gearbox, and attachment arms may increase cost and weight of the vehicle.

SUMMARY

According to one embodiment, a drive mechanism for adjusting a position of a vehicle closure with respect to a vehicle body, is provided. The drive mechanism may include a linear drive, a first bracket, a second bracket, and a third bracket. The linear drive may include a spindle and a spindle nut that may translate along the spindle. The first bracket may include a plurality of first teeth and the third bracket may include a plurality of second teeth. The linear drive may include a first gear, that may be disposed on a first side of the second bracket, and a second gear that may be disposed on a second side of the intermediate bracket. Either the second bracket or the third bracket may be coupled to the spindle nut. The first gear may be configured to engage the plurality of first teeth and the second gear may be configured to engage the plurality of second teeth. The drive mechanism may include a check arm that may be pivotally coupled to or configured to be pivotally coupled to either the vehicle body or the vehicle closure. Actuation of the linear drive may translate the spindle nut such that the second bracket and third bracket translate to pivot the check arm to adjust the position of the vehicle closure.

According to one embodiment, a drive mechanism for adjusting a position of a vehicle closure with respect to a vehicle body, is provided. The drive mechanism may include a linear drive, a stationary bracket, a first translating bracket, a first gear, second translating bracket, and a second gear. The linear drive may include a spindle and a spindle nut that may translate along the spindle. The stationary bracket may include a plurality of first teeth and the second translating bracket may include a plurality of second teeth. The first translating bracket may be coupled to the spindle nut. The first gear and the second gear may be coupled to one another. Actuation of the linear drive may translate the spindle nut at a first predetermined speed and translate the second translating bracket at a second predetermined speed. The second predetermined speed may be different from the first predetermined speed. When the second translating bracket is coupled to the vehicle closure, the position of the vehicle closure may be adjusted.

According to yet another embodiment, a drive mechanism for adjusting a position of a vehicle closure, with respect to a vehicle body, is provided. The drive mechanism may include a linear drive and a telescoping arrangement. The linear drive may include a spindle and a spindle nut and the telescoping arrangement may be coupled to the spindle nut and include a pair of gears coupled to one another. As the spindle rotates, the pair of gears may rotate to extend and retract translating portions of the telescoping arrangement in a telescoping manner such that the position of the vehicle closure may be adjusted.

DETAILED DESCRIPTION

Figure 1:
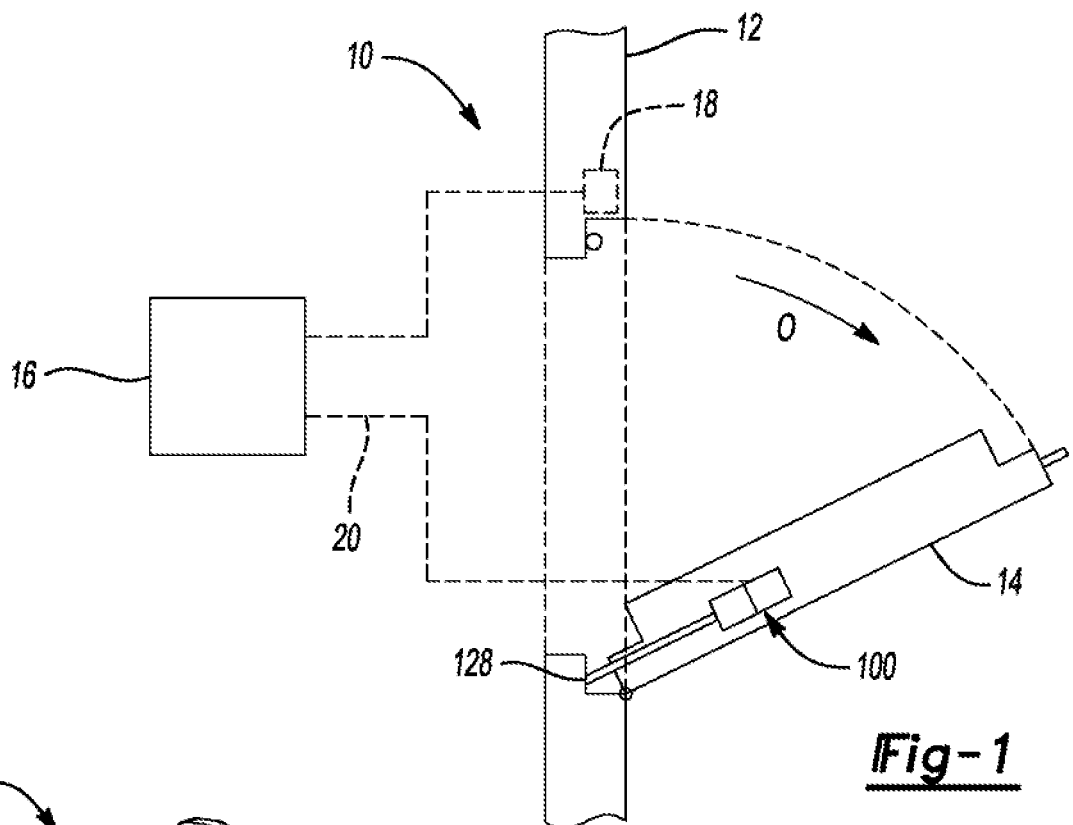
FIG. 1 is a schematic view of a vehicle including a vehicle closure and an exemplary drive mechanism.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5% or 10% of the value or relative characteristic.

The term "couple" or "coupled" may be used herein to describe disclosed or claimed embodiments. The term "couple" or "coupled" may refer to fasten, link, or associate one object with another, either directly or indirectly.

The term "non-slip clutch" may be used herein to describe disclosed or claimed embodiments. The term "non-slip clutch" may refer to a clutch that is designed not to slip, so that torque may only be transmitted when the clutch is fully engaged.

Although the terms first, second, third, etc. may be used to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms when used herein do not imply a sequence or order unless clearly indicated by the context. Thus, a first element, component, region, layer or section discussed below could be termed a second element, component, region, layer or section without departing from the teachings of the example embodiments.

Dog clutch means a device for coupling two shafts in order to transmit motion, one part having teeth which engage with slots in another.

Drive mechanisms for adjusting a vehicle closure relative to a vehicle body are known. Door drive mechanisms that use a spindle and a spindle nut may exert a greater force and be more robust than other door drive mechanisms that employ a cable and pulley coupled to a check arm and a drive. These door drive mechanisms include a spindle nut that is attached to the check arm. Because the spindle nut is attached to the check arm the spindle must have sufficient length for the spindle nut to travel along the spindle to provide the range of adjustment of the vehicle closure between closed and open positions. Under certain circumstances, the spindle may be too long to package between the vehicle closure and the vehicle body.

Referring to FIG. 1, a drive mechanism 100 for use with a vehicle 10 provided with a body 12 and a closure 14, is provided. The drive mechanism 100 may be configured to adjust a position of the closure 14, e.g., to open O or close the closure 14. The vehicle closure 14 may be a front-side door, rear-side door, rear hatch, deck lid, or other vehicle flap. While the vehicle closure 14 is depicted as being pivotally connected to the vehicle body 12, the vehicle closure 14 may also be a sliding door, configured to translate along the vehicle body 12. In one or more embodiments, the vehicle 10 may include a controller 16 configured to communicate 20 with the drive mechanism 100 and one or more sensors 18.

Referring generally to the figures, the drive mechanism 100 may include a linear drive 102, provided with a motor 103 and a gearbox 105 operatively coupled to a spindle 104, and a spindle nut 106. The drive mechanism 100 may include a translating portion that may include a first bracket such as a stationary or fixed bracket 108 that may include a plurality of first teeth 110. The first teeth 110 may form at least a portion of a first elongated rack 112 that extends in a longitudinal direction defined by the fixed bracket 108.

The translating portion may include a second bracket, such as an intermediate bracket 114 and a third bracket, such as an output bracket 116. The intermediate bracket 114 may be nested within the fixed bracket 108 and the output bracket 116 may be nested within the intermediate bracket 114. The output bracket 116 may sandwich the intermediate bracket 114 to the fixed bracket 108. The output bracket 116 may include a plurality of second teeth 118 that may form at least a portion of a second elongated rack 119 that may extend in a longitudinal direction defined by the output bracket. The intermediate bracket 114 may include a first side 120 and an opposing second side 122.

A first gear such as a first pinion gear 124 may be disposed on the first side 120 of the intermediate bracket 114 and a second gear, such as a second pinion gear 126 may be disposed on the second side 122 of the intermediate bracket 114. The first pinion gear 124 may be configured to engage the first plurality of teeth 110 of the first elongated rack 112 and the second pinion gear 126 may be configured to engage the second plurality of teeth 118. As the spindle 104 is rotated, the spindle nut and intermediate bracket 114 translates along the fixed bracket 108.

The first pinion gear 124 and the second pinion gear 126 may be coupled to another so that as either the first pinion gear 124 or the second pinion gear 126 begin to rotate, rotational motion is transmitted to the other pinion gear. The first pinion gear 124 may begin to rotate as the intermediate bracket 114 translates in response to rotation of the spindle 104 and translation of the spindle nut. As the second pinion gear 126 rotates, the second pinion gear 126 engages the plurality of second teeth 118 of the second elongated rack 119 so that the output bracket 116 translates along the intermediate bracket 114. As the first pinion gear 124 and the second pinion gear 126 rotates, the intermediate bracket 114 and the output bracket 116 may each translate in a substantially simultaneous manner.

In one or more embodiments, the first and second elongated rack 112, 119 may each be integrally formed to the fixed bracket 108, and the output bracket 116, respectively. For example, the elongated rack 112, the fixed bracket 108, or both may be formed by as one piece by injection molding. As another example, the elongated rack 112, 119 may be formed by a multi-shot injection molding process or an over-molding process so that the elongated rack 112, 119 is separate from the fixed bracket 108 or output bracket 116. If the elongated rack 112, 119 is not integrally formed to one or more of the brackets, it may be substantially fixed such as bonded to the fixed bracket 108 or output bracket 116. As yet another example, the elongated rack 112, 119 may be a cast or a fine-blanked part formed of a metal, such as SAE 4130 or another suitable metal or alloy.

The first pinion gear 124 and the second pinion gear 126 may coupled to one another by a dog clutch. In one or more embodiments, the dog clutch 156 may be formed by one or more first protrusions 158 disposed on the first pinion gear 124 and by one or more second protrusions 160 disposed on the second gear 126. The first protrusions 158 and the second protrusions 160 may be arranged so that the first protrusions 158 engage the second protrusions 160 so that the first pinion gear 124 and the second pinion gear 126 are coupled to one another. The first and second protrusions 158, 160 may engage one another to form a non-slip clutch.

As another example, the dog clutch 156 may be formed by a first spline 162 formed by the first pinion gear 124 and a second spline 164 formed by the second pinion gear 126. The first and second splines 162, 164 are not explicitly shown but one of ordinary skill in the art would understand the use of splines to couple one or more gears to one another.

In one or more embodiments, the spindle nut 106 may be coupled to the output bracket 116. When the spindle nut 106 is coupled to the output bracket 116 the second pinion gear 126 may begin to rotate before or at substantially the same time as the first pinion gear 124. As the second pinion gear 126 rotates, the second pinion gear 126 engages the plurality of second teeth 118 of the elongated rack 119 so that the output bracket 116 translates along the intermediate bracket 114. The output bracket 116 and the intermediate bracket 114 may translate in a first direction D1 and an opposing second direction D2, A check arm 128 may be pivotally coupled to the vehicle closure 14 and the output bracket 116. As the output bracket 116 translates, the check arm 128 may apply a force to the closure 14 so the closure 14 is adjusted e.g., pivoted in an opening direction, away from the vehicle body 12, or in a closing directed, towards the vehicle body 12.

In one or more embodiments, the plurality of first teeth 110 of the first rack 112 and the plurality of second teeth 118 of the second elongated rack 119 may extend in a direction that is substantially transverse to the first and second directions D1, D2. The first rack 112 may have a first length L1 and the second rack 119 may have a length L2. As one example, the length L2 of the second rack 119 may be less than the length L1 of the first rack 112.

The first pinion gear 124 may include a plurality of first-gear teeth 130 and second pinion gear 126 may include a plurality of second-gear teeth 132. In one or more embodiments, the number of teeth of the plurality of first-gear teeth 130 and the number of teeth of the plurality of second-gear teeth 132 may be equal. As another example, the number of teeth of the plurality of first-gear teeth 130 may be less than or greater than the number of teeth of the plurality of second-gear teeth 132. The number of teeth of the first pinion gear 124 and the second pinion 126 gear may be based on one or more variables, including but not limited to, forces required to adjust the closure 14, speed of operation.

The linear drive 102, spindle 104, and spindle nut 106 may be arranged so the spindle nut 106 translates along the spindle 104 at a first predetermined speed. The first predetermined speed may be based on various factors, including but not limited to, a gear ratio of the linear drive 102, a rotational speed of the motor 103, thread pitch of the spindle 104 and the spindle nut 106.

The intermediate bracket 114 may move or translate at a second predetermined speed. When the spindle nut 106 is coupled to the intermediate bracket 114, the second predetermined speed may be substantially equal to the first predetermined speed of the spindle nut 106. As the intermediate bracket 114 translates at the second predetermined speed, the output bracket 116 may translate a third predetermined speed that is greater than, for example at least 50% greater than, the second predetermined speed.

Alternatively, when the spindle nut 106 is coupled to the output bracket 116, the second predetermined speed of the intermediate bracket 114 may be greater than, for example at least 50% greater than, the first predetermined speed of the spindle nut 106 and a fourth predetermined speed of the output bracket 116.

The fixed bracket 108 may include a first channel 134 and a second channel 136 that opposes the first channel 134. The output bracket 116 may include a third channel 140 that is adjacent to the first channel 134 of the fixed bracket 108. The output bracket 116 may also include a fourth channel 138 that is adjacent to the second channel 136. In one or more embodiments, the first elongated rack 112 may extend along the first channel 134 of the fixed bracket 108. The second elongated rack 119 may extend along the fourth channel 140 of the output bracket 116.

The intermediate bracket 114 may define a fifth channel 142 and an opposing sixth channel 144. The fifth channel 142 may engage a flange 146 of the first channel 134 and the sixth channel 144 may engage a flange 148 of the second channel 136. The intermediate bracket 114 may define an aperture 150 that is configured to receive portions of the first and second pinion gears 124, 126. In one or more embodiments, a bearing sleeve 152 may extend from the intermediate bracket 114 and include an inner periphery 154 that defines a bearing surface. Portions of the first and second pinion gears 124, 126 may rotate along the bearing surface of the inner periphery 154.

The predetermined speed of the intermediate bracket 114 and the output bracket 116 may be measured with respect to the fixed bracket 108. The speed of the intermediate bracket 114 and output bracket 116 may be based on the number of teeth and the diameter of the first gear 124 or second pinion gear 126. The speed of the brackets may also be based on the relative position of the first and second racks 112, 119 with respect to the first and second gears 124, 126.

One of ordinary skill in the art would appreciate that the speed of the brackets is inversely proportional to a force of the brackets. The speed and force of the brackets and their relationship to the geometry of the gears is provided by the equations below:

$$V1 = \frac{V2 \times (Tp1 + Tp2)}{Tp1}$$

$$F1 = \frac{F2 \times Tp1}{(Tp1 + Tp2)}$$

Where:
V1 represents the speed (mm/sec.) of the output bracket 116;
V2 represents the speed (mm/sec.) of the intermediate bracket 114;
Tp1 represents the number of teeth of the first pinion gear 124;
Tp2 represents the number of teeth of the second pinion gear 126;
F1 represents the force (N) of the output bracket 116; and
F2 represents the force (N) of the input bracket 114.

In one or more embodiments, the spindle nut 106 may be coupled to the output bracket 116 and the intermediate bracket 114 may be coupled to the check arm 128. Coupling the spindle nut 106 to the output bracket 116 may increase the force applied to the check arm 128. As the force applied to the check arm 128 increases the distance traveled by the spindle nut 106 and output bracket 116 decreases. As such, the length of the of the spindle 104 may be increased to provide the additional travel.

Figure 2:
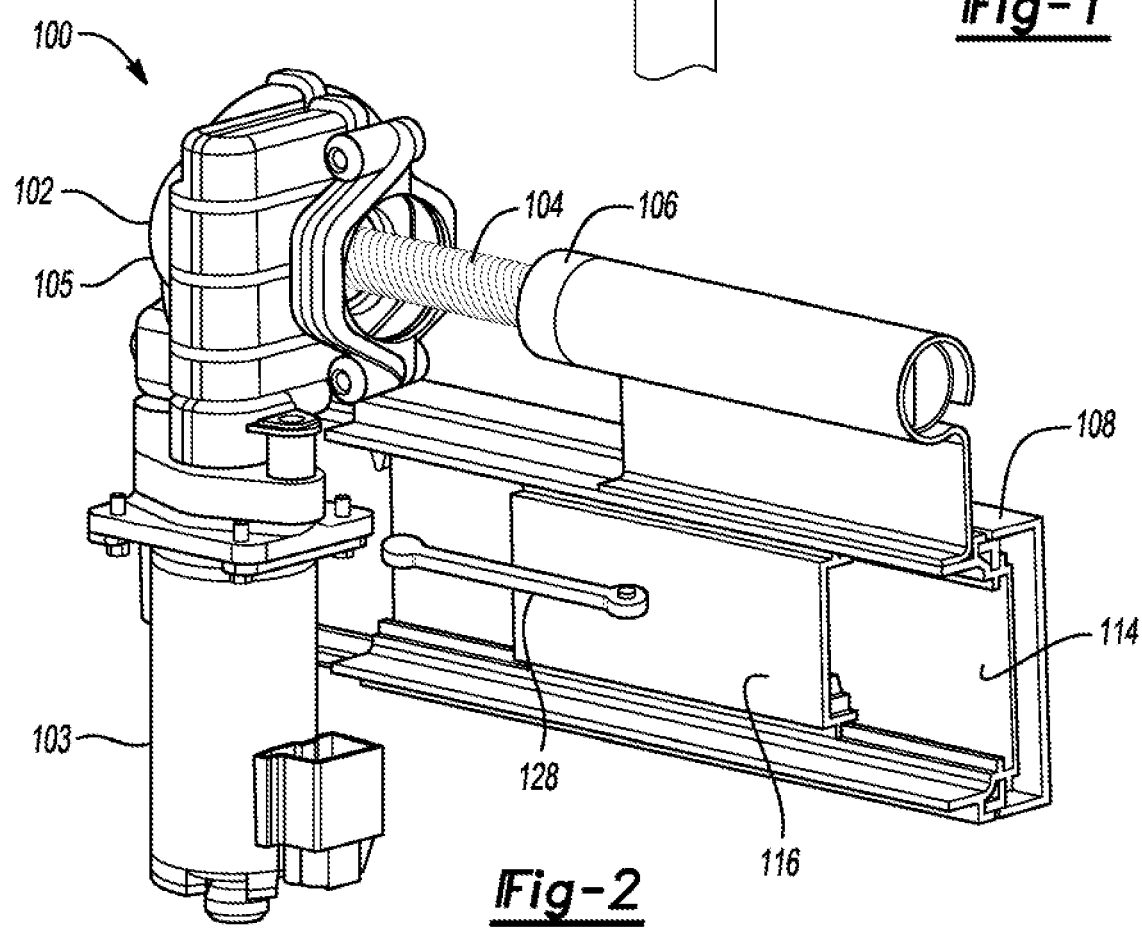
FIG. 2 is a perspective view of an exemplary drive mechanism.

Referring to FIG. 2, a perspective view of the drive mechanism 100 in a first position, is provided. As was mentioned above, when the spindle nut 106 is fixed to the intermediate bracket 114, the spindle nut 106 and intermediate bracket 114 translates in the first direction D1 and the second direction D2. From the first position illustrated in FIG. 2, the spindle nut 106, intermediate bracket 114, and output bracket 116 may translate in the first direction D1 to move the vehicle closure in the closing direction. When the drive mechanism 100 includes the check arm 128, the check arm 128 may pivot about the output bracket 116 to pull or push the vehicle closure 14.

Figure 3:
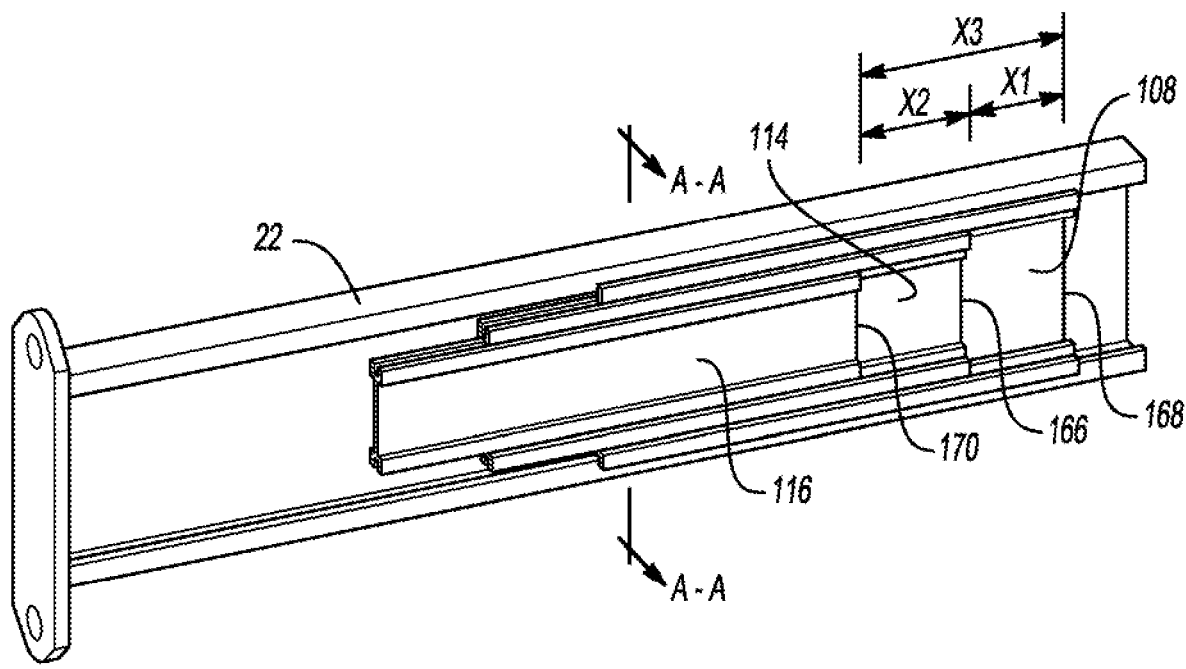
FIG. 3 is a partial-perspective view of a portion of an exemplary drive mechanism.

Referring to FIG. 3, a perspective view of a portion of the drive mechanism 100, such as the translating arrangement, coupled to a base member 22 is provided. The base member 22 may be a portion of the vehicle body 12 such as a rocker panel, fender, or a frame member of the vehicle. As another example, the base member 22 may be a portion of the vehicle closure 14.

The telescoping arrangement may move between a retracted position or retracted state to an extended position or extended state. Here, the telescoping arrangement is in the extended position. When the telescoping arrangement is in the retracted position, an edge 166 of the intermediate bracket 114 may be positioned substantially aligned with an edge 168 of the fixed bracket 108. As the intermediate bracket 114 moves from the retracted position to the extended position, the intermediate bracket 114 may be displaced by a distance of X1 and a rear edge 170 of the output bracket 116 may be displaced from by a distance of X2, with respect to the rear edge 166 of the intermediate bracket 114. The output bracket 116 and intermediate bracket 114 may translate at the same time so that the rear edge 170 of the output bracket 116 is displaced by a distance of X3, with respect to the rear edge 168 of the fixed bracket 108. In one or more embodiments, the distances X1 and X2 may be substantially equal to one another.

Figure 4:
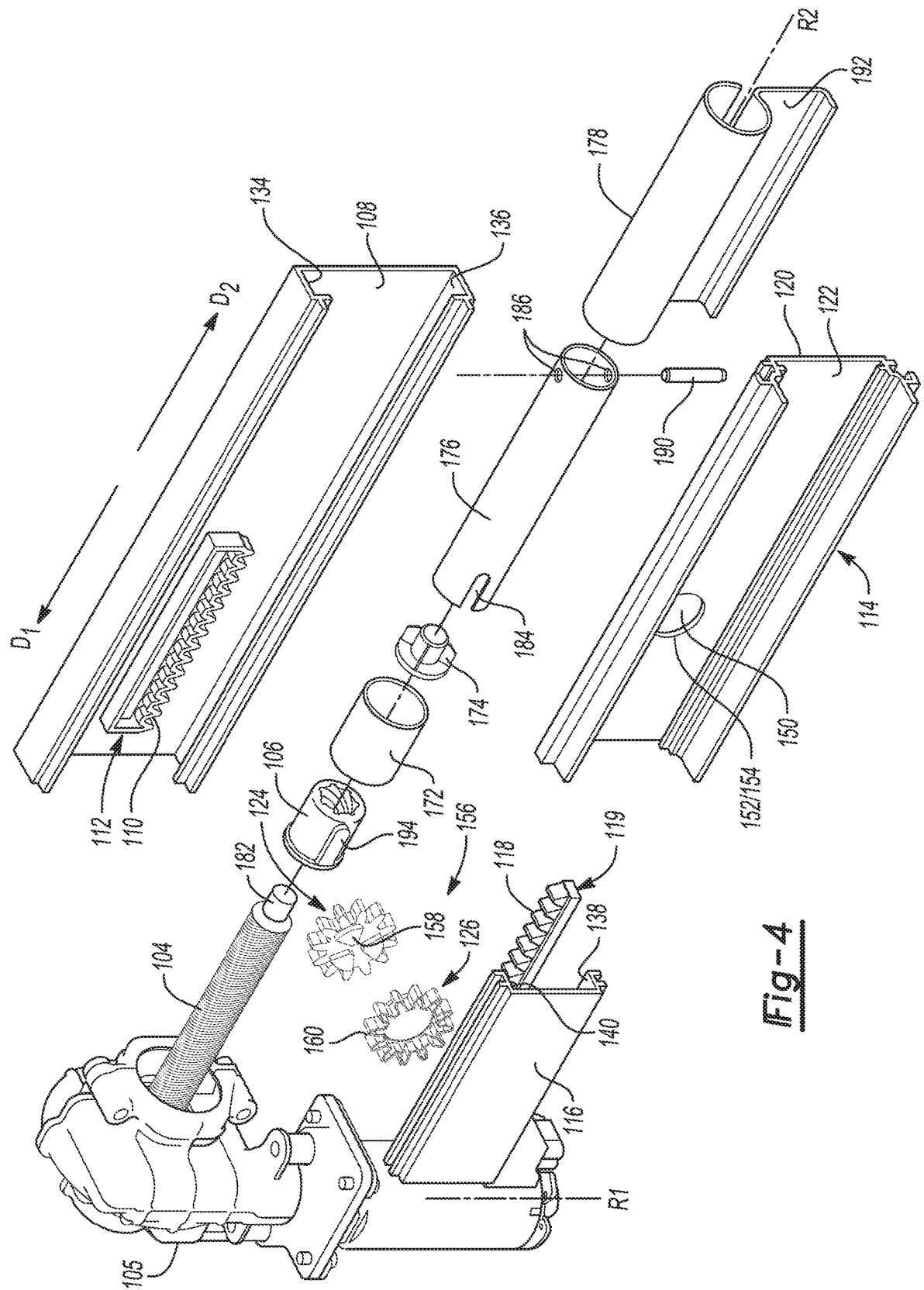
FIG. 4 is an exploded view of the exemplary drive mechanism.

Referring to FIG. 4, an exploded view of an exemplary drive mechanism 100 is provided. As was described above, the drive mechanism 100 includes the linear drive 102 that may include the motor 103 and the gearbox 105. The spindle 104 may extend from and be operatively coupled to the gearbox 105 so that as the motor 103 rotates about the first rotational axis R1 the spindle rotates about the second rotational axis R2. The first rotational axis R1 and the second rotational axis R2 may be positioned orthogonally to one another. In one or more embodiments, the spindle 104 and the gearbox 105 may be arranged so the spindle does not translate. Rather, the spindle nut 106 may translate along the spindle 104.

The drive mechanism may include a first sleeve 172 configured to receive the spindle nut 106. The first sleeve 172 may receive the spindle nut 106 so that outer surfaces of the spindle nut 106 engages an inner periphery of the first sleeve 172. The spindle 104 may include an end portion 182 that may engage an end stop member, such as a nut 174. The first sleeve 172 may engage a second sleeve 176 that may couple the first sleeve 172 to a third sleeve 178. The second sleeve 176 may include a slot 184 that may receive a protrusion 194 of the spindle nut 106. The second sleeve 176 may also include a pair of apertures configured to receive a pin 190 to fix the second sleeve 176 to the third sleeve 178. In one or more embodiments, the end of the spindle 182 may be supported by one or more supporting members that may be coupled to the fixed bracket 108.

The third sleeve 178 may be attached to or be integrally formed with a connection bracket 192, the intermediate bracket 114, or the output bracket 116. The connection bracket 192 may be fixed to the intermediate bracket 114 by one or more fasteners or other suitable methods of fixation. The third sleeve 178 may be semi-circular and have a C-shaped cross-section. The C-shaped cross-section may facilitate attaching the third sleeve 178 to the second sleeve 176 by snapping or pressing the third sleeve 178 to the second sleeve 176. The arrangement of the spindle nut 106 and the intermediate bracket 114 may be different than what is illustrated in FIG. 4.

As previously mentioned, the first gear 124 may include one or more first protrusions 158 that may be configured to engage a second set of protrusions, aperture, or recesses (not shown) formed on the second gear 126. While the protrusions 158 are illustrated, in one or more other embodiments the first gear 124 and the second gear 126 may be splined to one another.

Figure 5:
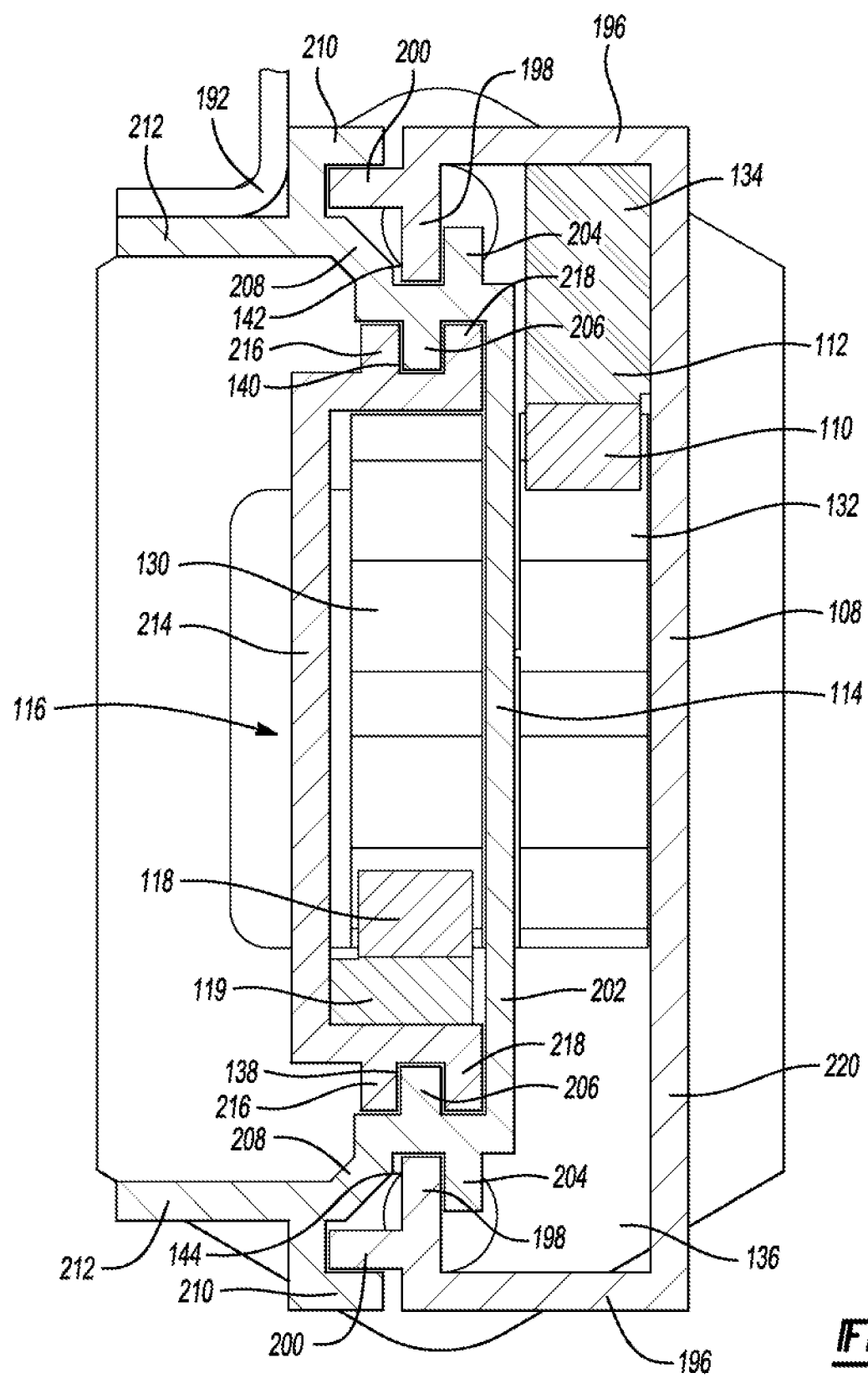
FIG. 5 is a cross-sectional view taken along lines A-A in FIG. 3.

Referring to FIG. 5, a cross-sectional view taken along lines A-A in FIG. 3 is provided. The fixed bracket 108 may include a sidewall 196 that extends from a main portion or wall 220. The first channel 134 and the second channel 136 may each be formed by the main portion 220, the sidewall 196, and a first wall 198 that may extend in a direction that is parallel to the main portion 220. The first elongated rack 112 and the first plurality of teeth 110 may be disposed in the first channel 134. The sidewall 196 may extend to a second wall 200.

The intermediate bracket 114 may include a main portion or wall 202 that may extend to a fourth wall 204, a fifth wall 206, and a sixth wall 208, a seventh wall 210, and an eighth wall 212. The fourth wall 204 may engage the first wall 198 of the fixed bracket 108 and the seventh wall 210 may engage the second wall 200 of the fixed bracket 108. The eighth wall 212 may be support and be attached to the connection bracket 192 that is coupled to the spindle nut 106.

The output bracket 116 may include a main portion or wall 214 that may extend in a direction that is parallel to the main portion 220 of the fixed bracket 108. The main portion 220 may extend to a ninth wall 216 and a tenth wall 218. The ninth wall 216 and the tenth wall 218 may engage the fifth wall 206. A portion of the output bracket 116 connecting the ninth wall 216 and the tenth wall 218 and the main portion 214 of the output bracket 116 may define the third channel 140 and the fourth channel 138. As previously mentioned above, the second elongated rack 119 and the plurality of second teeth 118 may be disposed within and extend along the third channel 138.

The third channel 140 and the fourth channel 138 may each be formed by the ninth wall 216 and a tenth wall 218. The fifth channel and the sixth channel may each be formed by the fifth wall 206 and sixth wall 208.

One or more bearings may be provided between the fixed bracket 108 and the intermediate bracket 114 and between the output bracket 116 and the intermediate bracket 114. As one example, the bearings may be disposed between the second wall 200 and sixth wall 208. In one or more embodiments, the ball bearings have a spherical shape, or they may be cylindrical. The bearings may be disposed within a cage so that the bearings are spaced apart from one another by a predetermined distance but are still free to rotate. Grease or other suitable friction modifier materials may be used between the fixed bracket 108 and the intermediate bracket 114 and between the output bracket 116 and the intermediate bracket 114.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.
10 vehicle
12 vehicle body
14 vehicle closure
16 controller
18 sensors
20 communicate
22 base member
100 drive mechanism
100 exemplary drive mechanism
102 linear drive
103 motor
104 spindle
105 gearbox
106 spindle nut
108 bracket
110 first plurality of teeth
112 first rack
114 intermediate bracket
116 output bracket
118 second plurality of teeth
119 second rack
120 first side
122 second side
124 first gear
126 second gear
128 check arm
130 first-gear teeth
132 second-gear teeth
134 first channel
136 second channel
138 fourth channel
140 third channel
142 fifth channel
144 sixth channel
146 flange
148 flange
150 aperture
152 bearing sleeve
154 inner periphery
156 dog clutch
158 first protrusions
158 second protrusions
158 protrusions
160 second protrusions
162 second splines
162 first spline
164 second spline
164 second splines
166 rear edge
166 edge
168 edge
168 rear edge
170 rear edge
172 first sleeve
174 nut
176 second sleeve
178 third sleeve
182 end portion
182 spindle
184 slot
190 pin
192 connection bracket
194 protrusion
196 sidewall
198 first wall
200 second wall
202 wall
204 fourth wall
206 fifth wall
208 sixth wall
210 seventh wall
212 eighth wall
214 wall
216 ninth wall
218 tenth wall
220 wall

What is claimed is:

1. A drive mechanism configured to adjust a position of a vehicle closure with respect to a vehicle body, the drive mechanism comprising:
   a linear drive including a spindle and a spindle nut;
   a first bracket including a plurality of first teeth;
   a second bracket defining an opening;
   a first gear disposed on a first side of the second bracket configured to engage the plurality of first teeth, wherein the first gear includes a first axial face;
   a third bracket including a plurality of second teeth, wherein the spindle nut is coupled to either the second bracket or the third bracket;
   a second gear disposed on a second side of the second bracket and configured to engage the plurality of second teeth, wherein the second gear includes a second axial face, wherein a portion of the second axial face extends through the opening and contacts the first axial face of the first gear; and
   a check arm pivotally coupled to the third bracket and configured to be coupled to the vehicle body or the vehicle closure, wherein actuation of the linear drive translates the spindle nut such that the second bracket and third bracket translate to pivot the check arm to adjust the position of the vehicle closure.

2. The drive mechanism of claim 1, wherein the linear drive includes a motor wherein when the linear drive is actuated, the motor rotates in a first rotational direction and the spindle rotates in a second rotational direction, wherein the second rotational direction orthogonal to the first rotational direction.

3. The drive mechanism of claim 1, wherein the plurality of first teeth form a first elongated rack, having a first length, and the plurality of second teeth form a second elongated rack having a second length, wherein the second length is less than the first length.

4. The drive mechanism of claim 3, wherein the first bracket includes a first channel and a second channel, opposing the first channel, wherein the third bracket includes a third channel and a fourth channel, opposing the third channel, wherein the third channel is adjacent to the first channel, wherein the first elongated rack extends along the first channel.

5. The drive mechanism of claim 4, wherein the second elongated rack extends along the fourth channel.

6. The drive mechanism of claim 4, wherein the second bracket includes a fifth channel, wherein the fifth channel engages a flange of the first channel.

7. The drive mechanism of claim 1, further comprising a bearing sleeve extending from the second bracket and wherein portions of the first gear and the second gear rotate along an inner periphery of the sleeve.

8. The drive mechanism of claim 1, wherein the first axial face of the first gear includes first protrusions and the second axial face of the second gear includes second protrusions or recesses that engage the first protrusions so that as the first gear rotates, the second gear rotates.

9. A drive mechanism configured to adjust a vehicle closure coupled to a vehicle body between a closed position and an open position, the drive mechanism comprising:
a linear drive including a spindle and a spindle nut;
a stationary bracket including a plurality of first teeth;
a first translating bracket defining an opening;
a first gear configured to engage the plurality of first teeth and including a first axial face;
a second translating bracket including a plurality of second teeth and configured to be coupled to the vehicle closure, wherein the spindle nut is coupled to the first translating bracket; and
a second gear configured to engage the plurality of second teeth, wherein the second gear includes a second axial face extending into the opening to contact the first axial face so that as the first gear rotates, the second gear rotates,
wherein actuation of the linear drive translates the spindle nut translates the first translating bracket and the second translating bracket so that the vehicle closure moves between the closed position and the open position.

10. The drive mechanism of claim 9, wherein the first translating bracket is nested within the stationary bracket.

11. The drive mechanism of claim 10, wherein as the first gear rotates along the plurality of first teeth, the first translating bracket extends from a retracted position.

12. The drive mechanism of claim 9, further comprising:
a check arm pivotally coupled to the second translating bracket so that as the first and second translating brackets translate, the check arm pushes the vehicle closure from the closed position to the open position.

13. A drive mechanism configured to adjust a vehicle closure with respect to a vehicle body between a closed position and an open position, the drive mechanism comprising:
a linear drive including a spindle and a spindle nut;
a telescoping arrangement coupled to the spindle nut and including,
a fixed member,
a translating portion nested within the fixed member and including a first translating member defining an opening,
a pair of gears each including an axial face extending into the opening and contacting one another such that as the spindle nut rotates, the pair of gears rotate to extend and retract the translating portion of the telescoping arrangement in a telescoping manner such that the position of the vehicle closure is adjusted.

14. The drive mechanism of claim 13, wherein the translating portion includes a second translating member nested in the first translating member.

15. The drive mechanism of claim 14, wherein the fixed member is configured to be fixed to either the vehicle closure or the vehicle body.

16. The drive mechanism of claim 14, further comprising a check arm pivotally coupled to the second translating member and configured to be coupled to either the vehicle closure or the vehicle body.

17. The drive mechanism of claim 14, further comprising a first sleeve and an arm extending therefrom, wherein the first sleeve is configured to receive the spindle nut and the arm is fixed to the first translating member such that the telescoping arrangement is coupled to the spindle nut.

18. The drive mechanism of claim 17, further comprising a second sleeve configured to receive the spindle nut and wherein the first sleeve receives the second sleeve.

19. The drive mechanism of claim 18, wherein the spindle nut includes a protrusion and the second sleeve defines a slot that receives the protrusion.

20. The drive mechanism of claim 19, further comprising:
a third sleeve; and
a nut fixed to an end of the spindle and disposed within the third sleeve.

* * * * *